United States Patent [19]

Otsuki et al.

[11] Patent Number: 4,903,730
[45] Date of Patent: Feb. 27, 1990

[54] PIPE COUPLING USED WITH AUTOMATIC CONNECTING AND DISCONNECTING DEVICE

[75] Inventors: Noboru Otsuki, Hyogo; Katsumi Tomioka, Kobe; Toshihiko Onishi, Hyogo, all of Japan

[73] Assignee: Nippon Air Brake Kabushiki Kaisha, Kobe, Japan

[21] Appl. No.: 378,912

[22] Filed: Jul. 12, 1989

[51] Int. Cl.$^4$ .............................................. F16L 37/28
[52] U.S. Cl. ........................... 137/614.03; 137/614.04; 251/175
[58] Field of Search ..................... 137/614.03, 614.04; 251/175

[56] References Cited

U.S. PATENT DOCUMENTS

| 2,905,486 | 9/1959 | Goodin, Jr. et al. | 137/614.03 |
| 4,289,164 | 9/1981 | Ekman | 137/614.03 |
| 4,447,040 | 5/1984 | Magorien | 137/614.03 |

FOREIGN PATENT DOCUMENTS 51-41934 11/1976 Japan.
64-43292 3/1989 Japan.

*Primary Examiner*—A. Michael Chambers
*Attorney, Agent, or Firm*—Morris Fidelman; Franklin D. Wolffe

[57] ABSTRACT

A pipe coupling consisting of a male and female elements for connecting and disconnecting a hydraulic or pneumatic piping used for industrial machinery. Each coupling element includes a check valve therein which is actuated by connecting and disconnecting operation to automatically open the passageway of the coupling when it is connected and to automatically close it when it is disconnected. The inventive pipe coupling is designed to be used with a conventional automatic connecting and disconnecting device such as automatic coupling device for large scaled industrial machinery.

4 Claims, 3 Drawing Sheets

PIPE COUPLING USED WITH AUTOMATIC CONNECTING AND DISCONNECTING DEVICE

BACKGROUND OF THE INVENTION

This invention relates to a coupling used with an automatic connecting and disconnecting device for hydraulic and pneumatic pipings for general industrial machinery, such as disclosed in Japanese patent publication No. S51-41934.

Japanese patent opening gazette No. S64-43292 discloses a pipe coupling of this type as described below with reference to FIGS. 1 and 2 of the accompanying drawings. This coupling comprises a first main body 2 fixed to a stationary face plate 1 and a second main body 4 fixed to a movable face plate 3. The first main body 2 is cylindrical in shape and has a joint mouth 5 in the front face and a pipe joint at the rear end. The second main body 4 has a front end portion having an outer diameter fitting in the joint mouth 5 and includes a second valve hole 8 in its front face 7 and a pipe joint 9 at the rear end. The first and second main bodies 2 and 4 have a common axis when they are fixed to the respective face plates 1 and 3 and the second main body 4 is adapted to move along the axis with movement of the movable face plate 3. The first main body 2 encloses therein a valve seat 10 sliding freely along the same axis. A valve seat 10 disposed in the first main body 2 can freely slide along the same axis. The valve seat 10 has a first valve hole 11 in its front end wall and is urged by a first spring 12 towards the joint mouth 5 to butt against a step 13 of the first main body 2. The first valve hole 11 is provided with a first check valve 14 for closing the valve hole 11 from its outside. The first main body 2 also encloses separately therein a valve hole 15 and a check valve 17 which is urged forward by a spring 16 to close the check valve 17 and the check valve 17 is coupled with the first check valve 14 through a connecting rod 18. The second main body 4 encloses therein a second check valve 20 having a greater diameter than the first check valve 14, which is urged by a second spring 19 for closing the second valve hole 8 from its inside. An annular sealing member 21 is disposed on the front face of the valve seal 10 at a position facing the front face of the second main body 4. The sealing member 21 is adapted to enclose the first and second valve holes 11 and 8 when the front face 7 is put into contact with the front face of the valve seat 10, so that, in such connected state, the valve seat 10 is urged against the second main body 4 to keep a sealed state by a hydraulic pressure acting to the valve seat 10 due to the diameter difference between the valve seat 10 and the sealing member 21.

This pipe coupling can be put into a connected state of FIG. 2 from a disconnected state of FIG. 1 by moving the movable face plate 3 toward the stationary face plate 1 by a predetermined distance. More specifically, when the second main body 4 fits in the joint mouth 5 of the first main body 2, the front face 7 of the second main body 2 is put in contact with the front face of the valve seat 10. With further movement, the front face of the second check valve 20 is put in contact with the front face of the first check valve 14 and the valve seat 10 is moved backward in the second main body 2 against the first spring 12 to cause the first check valve 14 to open the first valve hole 11. At the same time, the check valve 17 and the second check valve 20 push one another through the connecting rod 18 to open the valve hole 15 and the second valve hole 8, thereby providing a passageway between the pipe joints 6 and 9.

If the movable face plate 3 is moved backward from the state as shown in FIG. 4, a motion opposite to the above takes place. More specifically, the second check valve 20 and the check valve 17 are closed and, thereafter, the first check valve 14 is closed. Then, the valve seat 10 is moved forward in the first main body 2 and the front face 7 of the second main body 4 leaves the front face of the valve seat 10 to come in the disconnected state as shown in FIG. 1.

The above-mentioned prior art coupling shows no particular problem when any fluid is let flow therethrough after interrupting the feed of fluid into the first and second main bodies and then putting the coupling into the connected state of FIG. 2 from the state of FIG. 1. When both main bodies are connected under such a condition that high pressure fluid is kept in the second main body 4, however, the valve seat 10 may be separated from the second main body 4 by the fluid pressure during the connecting process to cause a problem of fluid leakage.

A cause of this fluid leakage is in the diameter difference provided between the second valve hole 8 of the second main body 4 and the annular sealing member 21. This diameter difference is resulted necessarily from the fact that the annular sealing member 21 is adapted to face a predetermined width of the annular front face 7 of the second main body 4, which encloses the second valve hole 8, at an intermediate position of the width. When the second check valve 20 slightly leaves the second valve hole 8 in the process from the state of FIG. 1 to the state of FIG. 2, therefore, the high pressure fluid in the second main body 4 flows out therethrough and into part of the gap between the front face 7 of the second main body 7 and the front face of the valve seat 10, which is inside the annular sealing member 21. At this time, however, the first valve hole 11 is not yet open enough and, therefore, the valve seat 10 is moved backward by the fluid pressure to cause temporary fluid leakage. When a high fluid pressure acts in the first main body 2, no fluid leakage will occur since the valve seat 10 is urged forward by this fluid pressure.

SUMMARY OF INVENTION

Accordingly, an object of this invention is to provide an improved pipe coupling used with an automatic connecting and disconnecting device, from which such temporary fluid leakage has been completely avoided.

This object can be attained in accordance with this invention which provides a pipe coupling of the type as described above, which is used with an automatic connecting and disconnecting device and characterized by a passageway provided for connecting a specific portion of the front face of the first main body which is enclosed by the annular sealing member when both main bodies are put in mutual contact to the interior cavity of the first main body, and a third check valve disposed close to the front face in this passageway. It is preferable to dispose the above passageway between the above-mentioned valve seat and the first check valve. The passageway can be formed in either the valve seat or the first check valve.

These and other objects and features of this invention will be described in more detail below with reference to the accompanying drawings.

BRIEF DESCRIPTION OF DRAWINGS

Throughout the drawings, same reference numerals are given to corresponding structural components.

DESCRIPTION OF PREFERRED EMBODIMENTS

Figure 1:
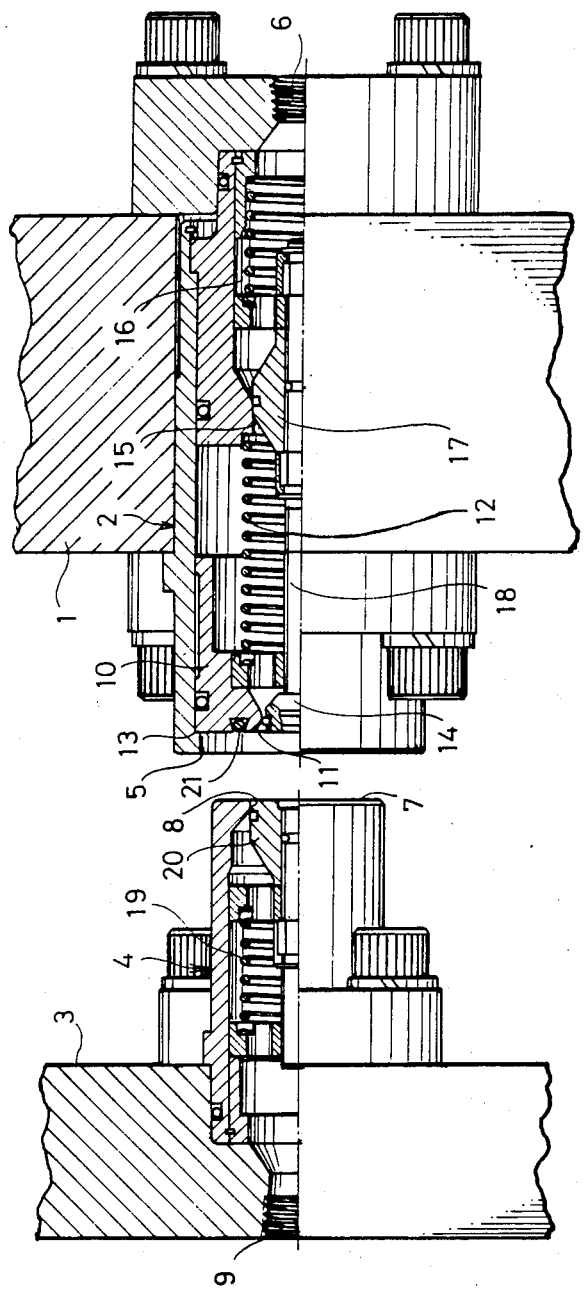
FIG. 1 is a partially sectional side view representing an example of the prior art pipe coupling in its disconnected state.
Figure 2:
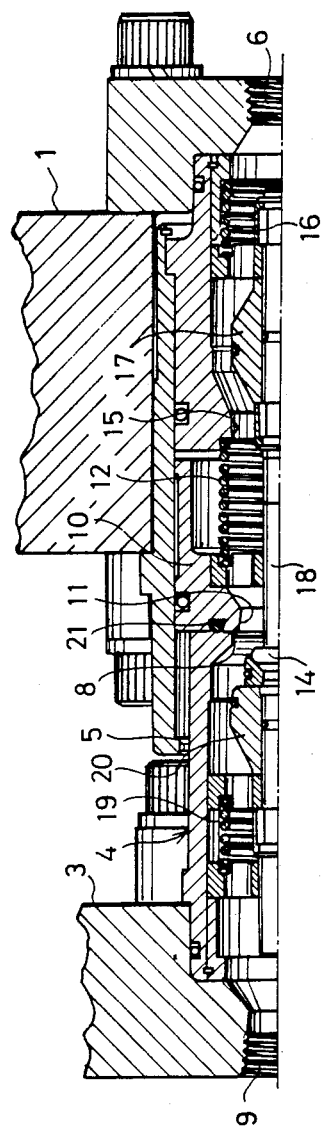
FIG. 2 is a sectional side view representing the pipe coupling of FIG. 1 in its connected state.

Referring to FIG. 1, the illustrated embodiment is substantially same as the prior art pipe coupling described above with reference to FIGS. 1 and 2, except that valve hole 15, spring 16 and check valve 17 are omitted from the first main body 2 and a passageway and a third check valve 31 are added. Therefore, no further description will be made about the corresponding components having the same reference numerals as the above.

The connecting rod 18 of the first check valve 14 is fixed at its rear end to a rear portion of the inner wall of the first main body 2 through a member 32 having through holes 34. The valve seat 10 has a circular hole 35 formed in its front end wall and the cylindrical third check valve 31 is slidably and fluid-tightly fit in this hole 35. The inner hole of the third check valve 31 constitutes the first valve hole 11 and a valve seat 36 is formed near the front end and adapted to be closed by the first check valve 14. The third check valve 31 is urged forward by a spring 40 disposed between an annular projection 37 formed on its outer surface and a spring seat 39 fit in an inner hole 38 of the valve seat 10 to close a gap between the valve seat 10 urged by the first spring 12 into its advance position and the first check valve 14 in the fixed position. This gap is the passageway. Numeral 41 denotes a holding ring fitting in the inner hole 38 of the valve seat 10 and butting against the spring seat 39. It has through holes 42 and a central hole in which the connecting rod 18 fits slidably.

If the valve seat 10 is moved backward in this structure, the third check valve 31 also moves backward to form a gap between the valve seat 36 and the first check valve 14 to open the first valve hole 11. The first valve hole 11 also opens when only the third check valve 31 is moved backward. The spring force of the first spring 12 is greater than that of the spring 40.

Figure 3:
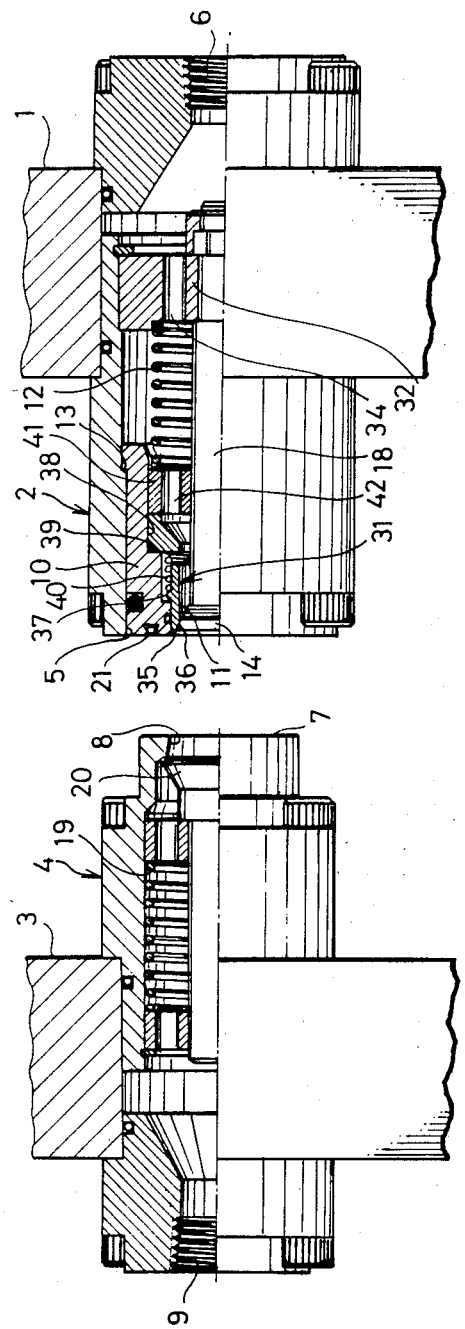
FIG. 3 is a partially sectional side view representing an embodiment of the pipe coupling according to this invention, which is in its disconnected state.

When the movable face plate 3 moves forward or rightwards in the case of this pipe coupling coming into connection from the disconnected state of FIG. 3, the front face of the second main body 2 will first come in contact with the front face of the valve seat 10 through the annular sealing member 21 and the front face of the first check valve 14 will then butt against the front face of the second check valve 20 to block its movement. With a further movement of the second face plate 3, the second main body 4 moves forward to cause the valve seat 10 to move backward against the first spring 12 and the second and first valve holes 8 and 11 begin to open one after another. Although the high pressure fluid flowing out from the second valve hole 8 at this time tries to forcedly separate the front face of the second main body 4 and the front face of the valve seat 10 which are mutually in contact through the annular sealing member 21, the third check valve 31 is opened by this fluid pressure to render the high pressure fluid to flow into the first main body 2. In other words, the first valve hole 11 which is then slightly open is further opened to pass the fluid into the first main body 2. Therefore, the tight contact state is kept through the annular sealing member 21 between front faces of the second main body 4 and the valve seat 10 to inhibit the high pressure fluid to flow out of the coupling. When the movable face plate 3 stops at a predetermined position after its movement, the first and second valves holes 11 and 8 are opened enough to provide the connected state of the coupling.

Figure 4:
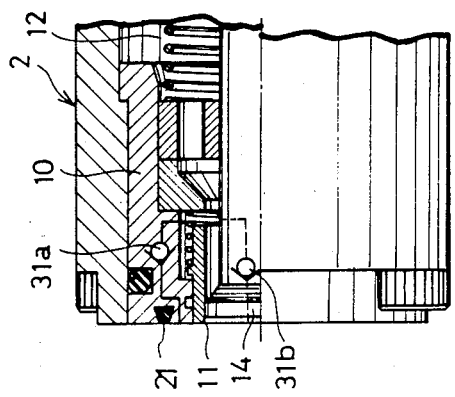
FIG. 4 is a partially sectional side view representing an essential part of another embodiment of the pipe coupling according to this invention.

While the third check valve is disposed between the valve seat 10 and the first check valve 14 in the above-described embodiment, it may be disposed in the valve seat 10 as symbolically indicated by 31a in FIG. 4 with a solid line passageway or in the first check valve 14 as shown therein by 31b with a dashed line passageway. The third check valve may be disposed in any other passageway connecting the front face area of the first main body 2 enclosed by the annular sealing member 21 to the interior of this body, provided that it inhibits the fluid from flowing through the passageway out of the first main body 2 from the interior thereof. It is also the case when the annular sealing member 21 is attached to the front face 7 of the second main body 4.

The above description was made only for illustrative purpose and means no limitation of the invention. It is a matter of course that various modifications and changes can be made by those skilled in the art within the scope of the invention as defined in the appended claims.

We claim:

1. A pipe coupling used with an automatic connecting and disconnecting device, comprising a cylindrical first main body having a connection opening in a front end face thereof, a second main body having a front end portion of an outer diameter which can fit in said connection opening and a second valve hole in a front end face thereof, said first and second main bodies arranged to face each other on a common axis and adapted to allow mutual approaching and departing movement, a valve seat disposed in said first main body and urged against said connection opening by a first spring, said valve seat having a first valve hole in a front end wall thereof and being slidable along said axis, a first check valve of a small diameter adapted to close said first valve hole of said valve seat from the outside thereof, a second check valve of a large diameter adapted to be urged by a second spring to close said second valve hole of said second main body from the inside thereof, and an annular sealing member disposed on one of the front end face of said valve seat and the front end face of said second main body, characterized in that said coupling further comprises a passageway for connecting a specific area of said front face of said first main body which is enclosed by said annular sealing member when both said main bodies are put in contact to the interior cavity of said first main body, and a third check valve disposed in said passageway for inhibiting fluid in said interior cavity from flowing out through said passageway into said specific area.

2. A pipe coupling as set forth in claim 1, wherein said passageway is disposed between said valve seat and said first check valve.

3. A pipe coupling as set forth in claim 1, wherein said passageway is formed in said valve seat.

4. The pipe coupling as set forth in claim 1, wherein said passageway is formed in said first check valve.

* * * * *